(12) United States Patent
Shankar et al.

(10) Patent No.: US 10,891,302 B2
(45) Date of Patent: Jan. 12, 2021

(54) SCALABLE SYNCHRONIZATION WITH CACHE AND INDEX MANAGEMENT

(71) Applicant: ACCENTURE GLOBAL SOLUTIONS LIMITED, Dublin (IE)

(72) Inventors: Subramanyam Shankar, Bangalore (IN); Viresh Veerasangappa Kadi, Bijapur (IN); Shebina Padmanabhan Kuttipunathil, Bellandur (IN); Saravana Kumar Palanivelrajan, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 499 days.

(21) Appl. No.: 15/864,811

(22) Filed: Jan. 8, 2018

(65) Prior Publication Data

US 2019/0213275 A1 Jul. 11, 2019

(51) Int. Cl.
*G06F 16/27* (2019.01)
*G06F 16/25* (2019.01)
*G06F 16/22* (2019.01)
*G06F 16/23* (2019.01)

(52) U.S. Cl.
CPC .......... *G06F 16/27* (2019.01); *G06F 16/2282* (2019.01); *G06F 16/2291* (2019.01); *G06F 16/2358* (2019.01); *G06F 16/252* (2019.01)

(58) Field of Classification Search
CPC ............. G06F 16/2282; G06F 16/2291; G06F 16/2358; G06F 16/252; G06F 16/27
See application file for complete search history.

(56) References Cited

U.S. PATENT DOCUMENTS

| 8,458,319 | B2* | 6/2013 | Samprathi | H04L 43/00 709/224 |
| 2004/0068516 | A1* | 4/2004 | Lee | G06F 16/182 |
| 2012/0122477 | A1* | 5/2012 | Sadek | H04W 16/14 455/456.1 |

(Continued)

OTHER PUBLICATIONS

Shraer et al. "Cloudkit", Proceedings of the VLDB Endowment, Associating of Computing Machinery, vol. 11, No. 5, Jan. 2, 2018, pp. 540-552 [Examiner annotated with line numbers] (Year: 2018).*

(Continued)

*Primary Examiner* — James E Richardson
(74) *Attorney, Agent, or Firm* — Mannava & Kang, P.C.

(57) ABSTRACT

A synchronization system including a cache obtains data updates from a one or more databases and stores the data updates at a device facing database which includes a custom indexed change table. The custom indexed change table stores change tracking data from individual change tracking tables of the one or more databases. When a synchronization request is received from a device, the synchronization request is parsed to obtain a list of synchronization parameters which are used to generate an index key. The index key is used to determine if the data responsive to the synchronization request is cached within the synchronization system. Based on whether the data is cached within the synchronization system, the data is transmitted directly from the cache to the device or the data is fetched from the device facing database, stored on the cache and transmitted to the device in response to the synchronization request.

20 Claims, 9 Drawing Sheets

(56) References Cited

U.S. PATENT DOCUMENTS

2012/0173485 A1     7/2012   Deepak et al.
2014/0258234 A1*   9/2014   Michels ................ G06F 16/273
                                                          707/638
2015/0347552 A1*   12/2015   Habouzit ............. G06F 16/273
                                                          707/613
2017/0097953 A1*   4/2017   Couckuyt ........... G06F 16/2308

OTHER PUBLICATIONS

European search opinion for Applicatio No. 18 214 064.0 (EP 18214064), dated Mar. 14, 2019 (Year: 2019).*

Alexander Shraer et al., "Cloudkit", Proceedings of the VLDB Endowment, Associating of Computing Machinery, vol. 11, No. 5, Jan. 2, 2018, pp. 540-552.

* cited by examiner

SCALABLE SYNCHRONIZATION WITH CACHE AND INDEX MANAGEMENT

BACKGROUND

The ubiquitous presence of data networks and the proliferation of computing devices including stationary or mobile devices has led to new applications being introduced every day. For example, new mobile applications are made available daily on multiple different application stores. Some of these applications rely on data updates between a backend application server and a device. During the updates, the devices running the applications, e.g., laptops, smartphones, desktops, or other types of computers and devices, are connected to the application servers via a communication network and may synchronize data from the servers at regular intervals. The synchronized data may be used for operations performed by the applications.

For many of these types of applications, the data is stored and processed in the server and sent to the device when requested using a synchronization process. Existing synchronization processes have limitations that are drawbacks during synchronization and that can result in performance degradation of an application. For example, there can be unnecessary database calls that cannot be stopped using existing synchronization processes, which can result in a delay for the devices obtaining data from the server. Also, bandwidth and storage limitations can affect the ability of the devices to obtain data quickly. Furthermore, for many existing synchronization processes, if an error is encountered during synchronization, the synchronization process is restarted no matter how much of the data has already been transferred prior to the error. These limitations of the existing synchronization processes can result in user-perceived degradation of application performance.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a synchronization system that enables one or more devices to synchronize data from one or more databases by connecting to a device facing database is disclosed. Each of the one or more devices can be enabled to select and transmit a list of synchronization parameters to the synchronization system in a request. The synchronization parameters can include name-value pairs of attributes associated with that particular synchronization required by the device. The synchronization system generates an index key using the synchronization parameters. The index key can be used to search a custom index defined on a custom indexed change table. The custom indexed change table can include a centralized repository that stores records of the changes that are made to the one or more databases. The actual data associated with the changes can be stored in separate tables in the device facing database. The custom index generated on the custom indexed change table can be employed to identify the data requested by the device for synchronization. If the data requested by the device is cached within the synchronization system, it can be transmitted to the device in response to the request from the device in byte format. The device can read the byte format data and parse it to the required format. If the data requested by the device is not cached, the data can be retrieved in byte format from the corresponding databases of the one or more databases storing the data, and the retrieved data can be stored within the device facing database within the synchronization system and transmitted to the device. An acknowledgement can be received from the device regarding a successful synchronization and change tracking data associated with the successful synchronization can be stored to a log table included on the device facing database.

Any additional synchronization requests with the same list of synchronization parameters are served from the synchronization system without having to hit the one or more databases. A cache can be maintained for a predetermined time period within the synchronization system and upon expiry of the time period, the cache can be cleared. The cache can be located at various elements such as an application server corresponding to the synchronization system, the device facing database, etc. The data to be synced remains unchanged for that particular time interval for the device specific synchronization parameters. The device facing database can be connected to the one or more databases, wherein each database can provide its updated data to the device facing database. When the data is moved from the one or more databases to tables on the device facing database, the change tracking data can also be moved from individual change tracking tables of the one or more databases to the custom indexed change table on the device facing database. Each discrete data element such as a row on the custom indexed change table can be provided a unique change tracking identifier when stored to the custom indexed change table. A collection of the unique change tracking identifiers of the rows in the custom indexed change table can form the custom index.

When a data update which is ready for transmission to one or more of the devices is updated from the databases, the synchronization system can transmit a message to the devices regarding the data update. In response to receiving the message, each device can select a list of synchronization parameters to be sent to the synchronization system. The synchronization parameters can include attribute names and values associated with the data to be updated. The synchronization parameters can include but are not limited to device name, device id, network details and the like. The synchronization parameters can additionally include an anchor value which, in an example, includes the unique identifier such as a row id or identification indicia of a last updated record in a latest synchronization update from the one or more databases. In an example, the anchor value can correspond to a unique identifier included in the custom index. The list of synchronization parameters can be sent from the device to the synchronization system via a data request. On receiving the data request from a device, the synchronization system processes the data request to obtain the list of synchronization parameters and to generate the index key which is used to search for and identify the data requested by the device.

In addition to providing a centralized repository for updates from the one or more databases, the synchronization system also provides a recovery mechanism when a device database of a device is corrupted and the device loses the anchor value. The synchronization system includes a device database generator tool that runs periodically at configurable time intervals to update copies of respective device databases maintained on the device facing database. When a message is received from one of the devices regarding corruption of its device database or loss of the anchor value, a current copy of the device database can be retrieved and transmitted to the device. Therefore, when subsequent updates are made to the device, the device can proceed to update from the latest value stored in the device database maintained by the device database generator tool instead of a full database synchronization that generates the device database in entirety. In an example, the synchronization system can further include tools such as user interfaces that enable providing information to administrative users regarding updates to the one or more devices from the databases.

The synchronization system described in examples herein can provide multiple technical improvements over existing synchronization systems and processes. The synchronization system according to examples described herein can employ index keys customized to particular synchronization requests and generated from specific synchronization parameters to service update requests from various devices. Moreover, the synchronization system also provides for caching data retrieved in response to particular synchronization requests for a configurable, predetermined time interval so that the synchronization requests can be served from a cache instead of from the one or more databases. The index-based synchronization described herein provides for a technical improvement which enables database systems to respond to data requests faster, thereby reducing latency as the number of round trips to the one or more databases on the backend are reduced and minimizing the potential for a user to perceive degradation of the application performance. As the data is transmitted to the cache and to the one or more devices in byte format which optimizes the usage of memory resources as the byte format does not include additional formatting tags such as the tags employed for data formatted in markup languages. Furthermore, the synchronization system enables implementing selective synchronization wherein a subset of a of the one or more devices can be synchronized in situations where some devices can have the latest copy of the data while other devices are yet to be updated. The synchronization system as described herein further makes the technology less dependent on the infrastructure as it reduces the dependency on resources such as memory, hard disk and CPU.

The synchronization system also provides for replicating respective device databases for the one or more devices on the device facing database. Such replication enables the devices to receive an exact copy of the device database from the device facing database in case the device is unable to access the device database due to memory corruption or other technical problems. Therefore, the device is able to resume subsequent synchronizations from the anchor value stored on the device facing database instead of a full device database synchronization that would be otherwise required. The synchronization system therefore also enables a recovery mechanism that improves the functioning of the client devices by allowing the client devices to recover quickly from failures.

Figure 1:
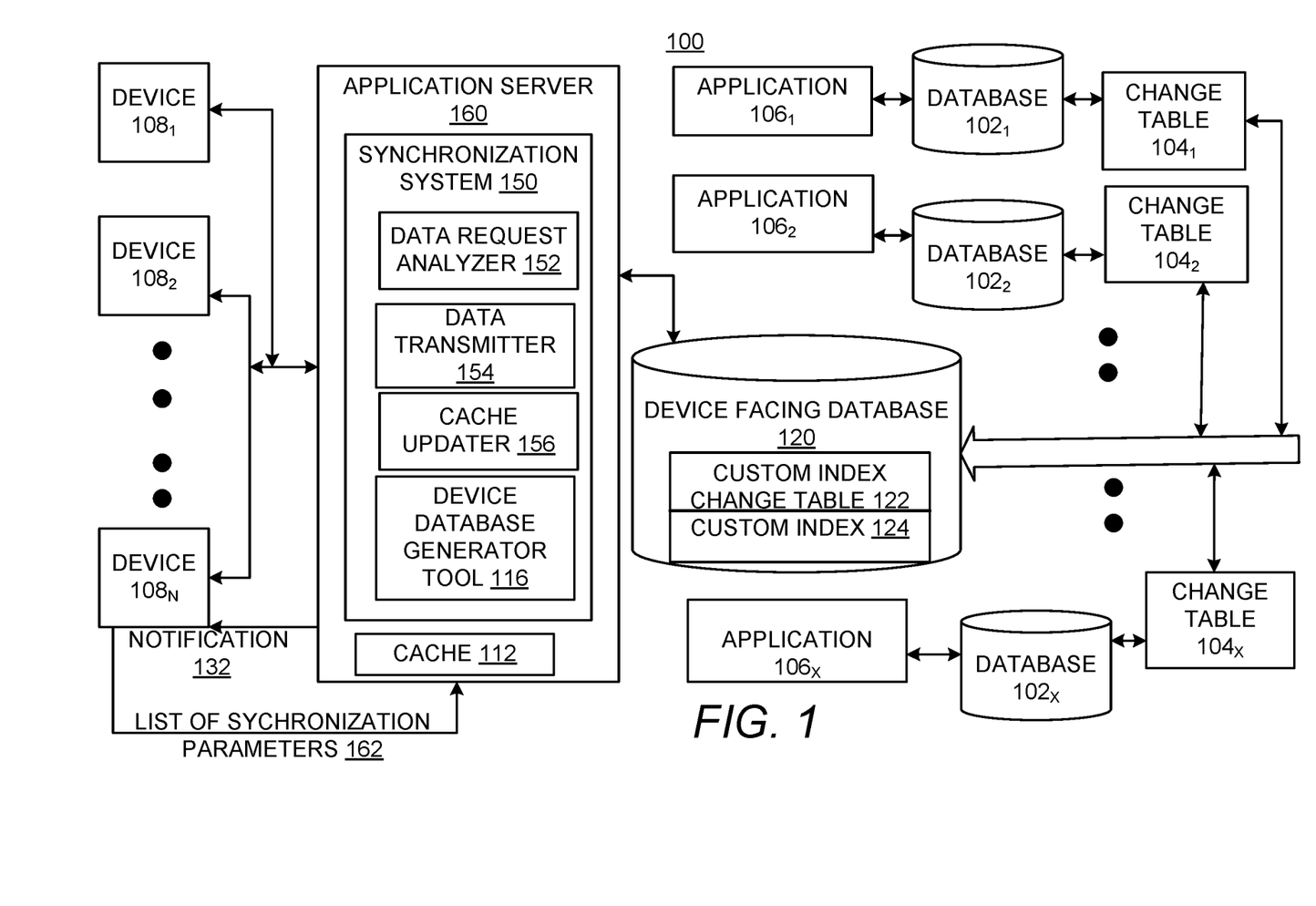
FIG. 1 is a block diagram showing an environment that includes a synchronization system in accordance with an example described herein.

FIG. 1 is a block diagram showing an example environment 100 that includes a synchronization system 150. The synchronization system 150 includes one or more databases $102_1, 102_2, \ldots 102_X$ that can be updated using a respective application or tool $106_1, 106_2 \ldots 106_X$. Though the terminology "one or more" is used in relation to databases $102_1, 102_2, \ldots 102_X$, it is understood that a plurality of databases (i.e., more than one of $102_1, 102_2, \ldots 102_X$) may be present in the synchronization system 150. The data from the one or more databases $102_1, 102_2, \ldots 102_X$ is provided to one or more client devices $108_1, 108_2, \ldots 108_N$. Though the terminology "one or more" is used in relation to client devices $108_1, 108_2, \ldots 108_N$, it is understood that a plurality of client devices (i.e., more than one of $108_1, 108_2, \ldots 108_N$) may be present in the synchronization system 150. Updating data can include without limitation, one or more of adding new tables, databases or adding new rows/records in data structures, deleting existing rows or changing values in one or more rows. Although databases $102_1, 102_2, \ldots 102_X$ are each shown as being updated by a respective application, it can be appreciated that this is not necessary and that multiple databases from the one or more databases $102_1, 102_2, \ldots 102_X$ can be updated by a single application. The databases $102_1, 102_2, \ldots 102_X$ can be associated with various types of applications, including web applications providing content, e-commerce applications, mobile payment portals and the like.

Change data capture provides for recording historical data regarding the changes that were made to tables in the databases $102_1, 102_2, \ldots 102_X$. The change data capture can include recording the fact that the data was changed and the actual changes that were made to the tables. When the data is changed in the databases, the corresponding change tracking entries are auto generated in the change tables for that particular table. The change tables provide a historical view of the changes that were made to the corresponding tables in the database over time. Accordingly, each of the databases $102_1, 102_2, \ldots 102_X$ can have a respective change tracking table $104_1$, $104_2$ ... $104_X$ associated therewith that record the changes made to the tables in the respective databases.

The synchronization system 150 is communicatively coupled to a device facing database 120 which includes at least a custom indexed change table 122. The device facing database 120 can include a centralized repository that stores data maintained for each of the change tracking tables $104_1$, $104_2$ ... $104_X$ of the individual databases $102_1$, $102_2$, ... $102_X$. When a new entry is generated in one of the change tracking tables $104_1$, $104_2$ ... $104_X$ it is updated to the custom indexed change table 122 for synchronization. The actual data associated with the changes updated to the change tracking tables $104_1$, $104_2$ ... $104_X$ is stored in the device facing database 120. The movement of data from multiple change tracking tables $104_1$, $104_2$ ... $104_X$ to the custom indexed change table 122 is done in such a way that the uniqueness of the data rows is maintained by identifiers (ids) that are uniquely assigned to the rows or records when moved from across the one or more databases $102_1$, $102_2$, ... $102_X$ to the device facing database 120. In an example, the unique change tracking identifiers that are assigned form a custom index 124 on the custom indexed change table 122. The custom index 124 may be employed to search for particular rows within the custom indexed change table 122. The custom indexed change table 122 includes indexes to each column of the databases $102_1$, $102_2$, ... $102_X$ in addition to index on the combinations of all the columns of change tracking data. The various indexes maintained on the custom indexed change table 122 help in retrieving data without performance impact.

Whenever one or more of the databases $102_1$, $102_2$, ... $102_X$ is changed, the information regarding the changes which may include one or more of inserts, deletes and updates, is updated to the custom indexed change table 122, the updated data is stored on the device facing database 120 and further cached for example, on a cache 112 on the application server 160. The information updated to the custom indexed change table 122 may include the database ids, such as row ids, of the changed rows. A notification 132 can be sent to one or more of the devices $108_1$, $108_2$, ... $108_N$ that are configured to receive the notifications associated with the updated databases. Upon receiving the notifications, the devices initiate or transmit synchronization requests to get the data. The data can be transferred from the cache 112 to the requesting devices in batches in byte format. In an example, the synchronization system 150 may be hosted by an application server 160 that supports an application being executed by one or more of the devices $108_1$, $108_2$, ... $108_N$.

The synchronization system 150 includes a data request analyzer 152 which analyzes the synchronization requests from the devices $108_1$, $108_2$, ... $108_N$ to identify not only the devices which are to receive the data but also to identify the particular data (including the row ids) to be sent to each of the requesting devices. A synchronization request from a device can include a list of synchronization parameters 162 such as a device id, an application id associated with the updated data and an anchor value. Based on the list of synchronization parameters 162, the data transmitter 154 not only identifies the data to be transmitted such as the number of rows to be updated and the like to the requesting device but also calculates the number of batches in which the data may be transmitted to the device. The data transmitter 154 further determines if the requested data is stored in the cache 112. If it is determined that the requested data is stored in the cache 112, the data is retrieved from the cache 112 and transmitted to the requesting device. If the requested data is not already stored in the cache 112, a cache updater 156 is included in the synchronization system 150 for updating the cache 112 via the device facing database 120 with data retrieved from one or more of the databases $102_1$-$102_X$. Subsequent requests for the same data from other devices may be served directly from the cache 112 without having to connect to the databases $102_1$-$102_X$. Of course, upon the expiration of the predetermined time period, for example, as set up by an administrator, the data in the cache 112 is deleted.

A device database generator tool 116 is also included in the synchronization system 150 and provides for a recovery mechanism for the one or more devices $108_1$, $108_2$, ... $108_N$. For example, if one of the devices $108_1$, $108_2$, ... $108_N$ has synced up to the nth data set and subsequently loses the data due to local database corruption or another issue, the device database generator tool 116 enables the device to recover data without having to start from the beginning. The device database generator tool 116 enables recovery by using a database generated by the device database generator tool 116 on the synchronization system 150. On identifying that an anchor value is lost by the device, the device makes a call to get the device database from the synchronization system 150. The device database generator tool 116, has the same schema as the device and the same data as the device database. Once the device recovers the device database from the device database generator tool 116, it may have an anchor value n and a next synchronization cycle may update values from n+1 rather than start from the beginning.

Figure 2:
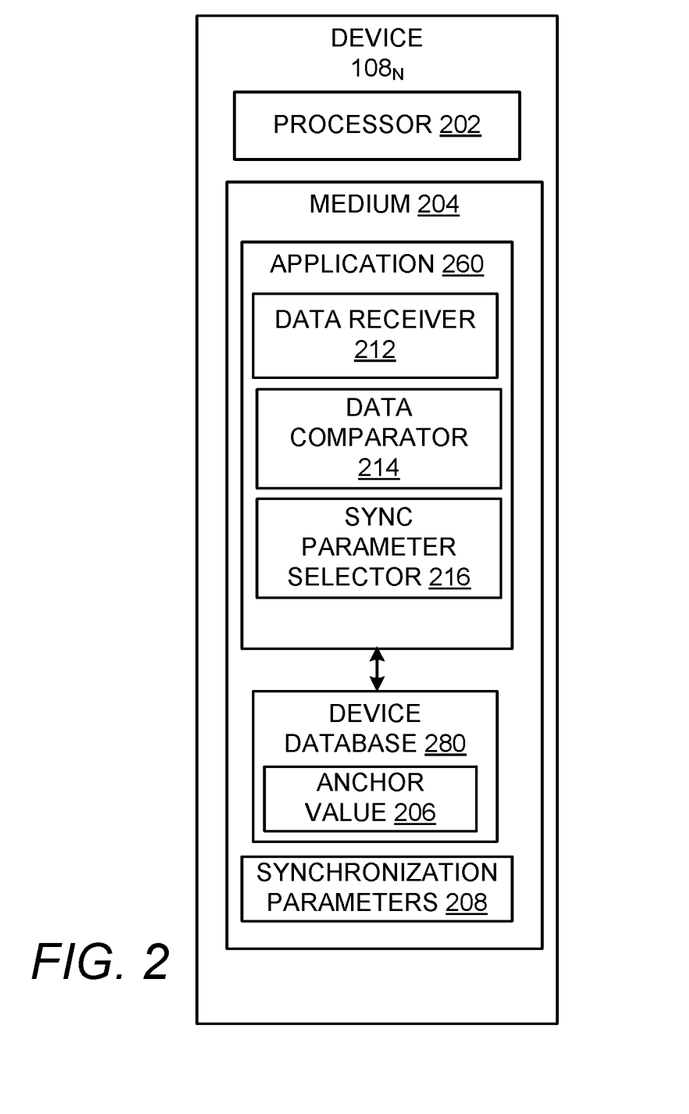
FIG. 2 is a block diagram that shows a device that is configured to exchange data with the synchronization system in accordance with examples described herein.

FIG. 2 is a block diagram that shows an example of one of the devices $108_N$ that is configured to exchange data with the synchronization system 150 in accordance with the methodologies described herein. While the block diagram of a single device $108_N$ is shown, it can be appreciated that the other devices include similar elements in order to be able to synchronize data with the synchronization system 150 and that the devices $108_1$, $108_2$, ... $108_N$ may include elements other than those shown in FIG. 2 without departing from the scope of the examples discussed herein. The device $108_N$ can include but is not limited to, a mobile device such as a laptop, a smartphone, a tablet device, a wearable computing device, a Virtual Reality (VR) or an Augmented Reality (AR) device or a stationary device such as a desktop and the like. The device $108_N$ includes at least a processor 202 and a processor-readable non-transitory storage medium 204 that stores an application 260 being supported by the application server 160. The application 260 includes elements which enable the device $108_N$ to request for and receive synchronization services from the synchronization system 150 in accordance with examples described herein. In an example, the application 260 may include a device-side or client-side elements that enable users to access the functionality provided the application server 160.

The application 260 can include a data receiver 212 that enables the device $108_N$ to receive the notification 132 regarding an update available for synchronization. The notification 132 may include identification regarding an application and an associated one of the databases $102_1$, $102_2$, ... $102_X$ which is updated, the row or record ids which have been updated, the type of update, a version number and the like. A data comparator 214 may be included in the device $108_N$ that enables comparing the information in the notification 132 to an anchor value 206. The anchor value 206 includes a database id (such as a row id) that identifies a latest value updated for that particular application. When, upon comparison with the anchor value 206, the data comparator 214 determines that the notification 132 includes data updates that have not yet been received by the device, a sync parameter selector 216 selects synchronization parameters 208 for the update.

Upon successful synchronization of data with the synchronization system 150, an acknowledgement is transmitted from the device $108_N$ to the synchronization system 150. The acknowledgement which may include the latest synchronization change tracking number or a latest anchor value 206 associated with the update is stored in log tables maintained by the synchronization system 150 on receipt of the acknowledgement from the device $108_N$. Storage of the synchronization change tracking number at the synchronization system 150 enables synchronizing the device $108_N$ even when the device database 280 is lost or otherwise corrupted. The device database generator tool 116 would have the same schema as the device $108_N$ and the same data as the device database 280. The device database generator tool 116 runs on a configurable interval of time to get the latest data from one or more of the databases $102_1$, $102_2$, ... $102_X$. Hence, when the device database 280 is lost, the device $108_N$ can synchronize from the device database generator tool 116 which has the latest copy of the device database 280 as opposed to the databases which may require the device to start the synchronization from the beginning.

Figure 3:
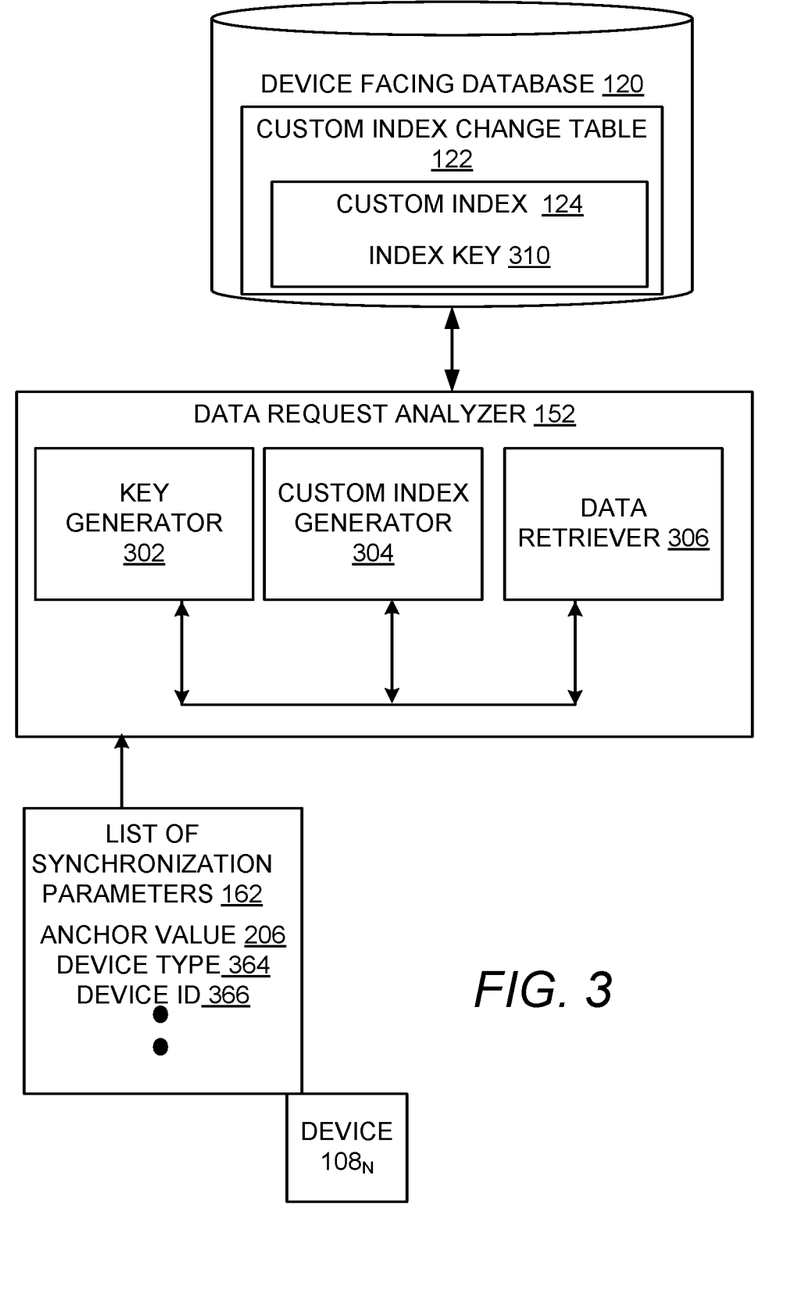
FIG. 3 shows a block diagram of a data request analyzer which analyzes an index key from a device in accordance with examples described herein.

FIG. 3 shows a block diagram of the data request analyzer 152 which configures an index key 310 to retrieve and transmit the requested data to the device $108_N$. A key generator 302 analyzes the synchronization request for data from the device $108_N$ to identify and extract the list of synchronization parameters 162. The list of synchronization parameters 162 can include at least an anchor value 206 and can optionally include a device type 364, a device id 366 and other parameters selected in accordance with examples described herein for obtaining the data update. The synchronization request from the device $108_N$ can be parsed to obtain the synchronization parameters from the list 162 by the key generator 302. The key generator 302 configures an index key 310, for example, by arranging the selected parameters in a predetermined order. In an example, the key generator 302 may be configured to identify specific patterns that represent the particular synchronization parameters 162. In another example, the values of the synchronization parameters without the corresponding names may be arranged in predetermined order to be composed or configured into the index key 310. The custom index generator 304 generates the custom index 124 in the custom indexed change table 122. In an example, the index key 310 forms an entry in the custom index 124. The data retriever 306 uses the custom index 124 to pull the data associated with the synchronization request. Initially, the data retriever 306 may attempt to pull the requested data from the cache 112. However, if the requested data is not present in the cache 112, the requested data may be retrieved from the device facing database 120 in order to be transmitted to the device $108_N$. The data thus retrieved is further populated to the cache 112 so that subsequent requests for the same data from the other devices of the one or more devices $108_1$-$108_N$ may be served from the cache 112 instead of connecting to the device facing database 120 thereby minimizing the database connections and speeding up the process of serving data requests.

Figure 4:
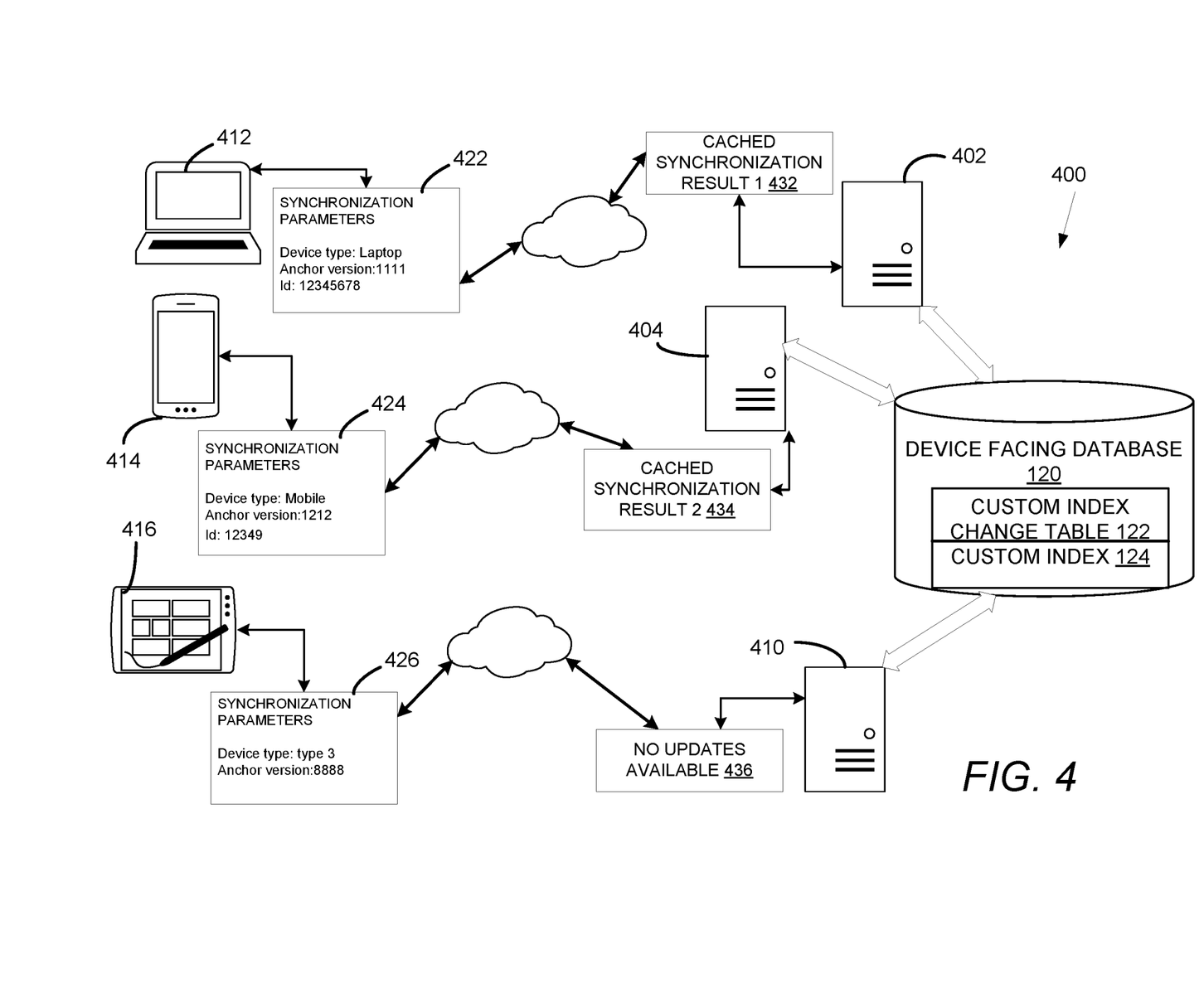
FIG. 4 illustrates an example environment that shows different synchronization results based on different synchronization parameters in accordance with examples disclosed herein.

FIG. 4 illustrates an example environment 400 that shows different synchronization results based on different synchronization parameters in accordance with examples disclosed herein. Various servers 402, 404 and 410 are shown which include the synchronization system as described herein. The servers 402, 404 and 410 may host different applications in an example. In another example, the servers 402, 404 and 410 may host different instances of the same application. Different devices including a laptop 412, a smartphone 414 and a tablet device 416 are shown as transmitting respective data requests with various lists of synchronization parameters 422, 424 and 426 to the servers 402, 404 and 410 via network clouds. Based on the analysis of the synchronization parameters 422, 424 and 426, the servers 402, 404 and 410 may provide different responses. For example, the server 402 returns a cached synchronization result 432 to the laptop 412 when the server 402 determines upon analysis of the synchronization parameters 422, that the requested data is included in the cache 112. Similarly, the requested data may be returned from the cache 112 in response 434 to the request from the smartphone 414. In response to the request from the tablet device 416, it was determined that there is no update to be transmitted. Accordingly, a message 436 to this effect is returned to the tablet device 416. The data in the responses 432 and 434 can be transmitted in byte format which the devices 412 and 414 may read and parse into different formats.

The synchronization parameters 422 from the laptop 412 are presented in the form of name-value pairs and include a device type with value 'laptop', an anchor value '1111' and an id for the device with value '12345678'. Similarly, the synchronization parameters 424 from the smartphone 414 and the synchronization parameters 426 from the tablet device 416 include name value pairs for device type, anchor value and the like. Thus, different devices may transmit different synchronization parameters and the responses 432, 434 and 436 to the devices are provided based on the received synchronization parameters. The responses 432 and 434 to the devices 412 and 414 can be provided from the cache 112 when the data exists within the cache 112. However, if the data is not present in the cache 112, the requested data is pulled from the device facing database 120 into the cache 112 and the data request is then serviced from the cache 112. The cache 112 and the synchronization system 150 can therefore be hosted on a single server or multiple servers. The synchronization system 150 also permits selective synchronization so that a device which has no data updates may stop synchronization while other devices may continue synching the data.

Figure 5:
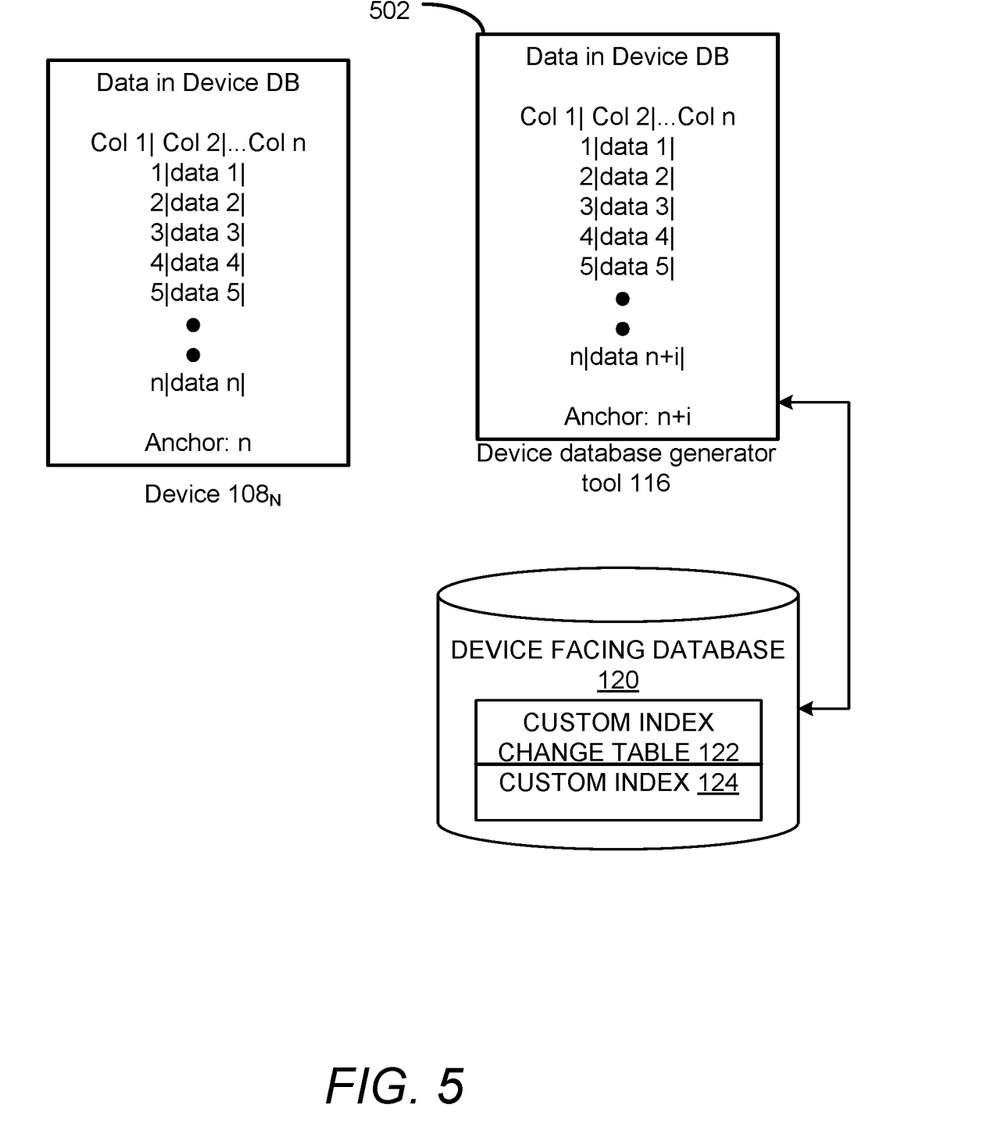
FIG. 5 depicts a recovery mechanism of the synchronization system in accordance with the disclosed examples.

FIG. 5 depicts the recovery mechanism of the synchronization system 150 in accordance with the disclosed examples. The device $108_N$ has synched a data set up to n values and therefore has an anchor value 'n'. For example, in subsequent synchronizations if the device $108_N$ loses the anchor value 'n' due to database corruption or other technical issue, the device $108_N$ would have to start from the beginning as the anchor value is lost. However, the device database generator tool 116 addresses such an issue by providing a recovery mechanism that generates a device database 502 within the synchronization system 150. The device database 502 may be generated on the application server 160 or on the device facing database 120. In an example, a full database synchronization may be generated in the form of a device database. The device database generator tool 116 runs on a configurable interval of time to update the device database 502 within the synchronization system 150 with the latest data from the one or more databases $102_1$-$102_X$ which can be accessed via the device facing database 120.

When the device $108_N$ determines that the anchor value "n" is lost, the device $108_N$ makes a call to the synchronization system 150 to get the device database 502. The device database generator tool 116 implements the same schema as the device $108_N$. The device $108_N$ on recovering the device database 502 from the device database generator tool 116, is now able to provide a valid anchor value 'n+i' for synchronization. Therefore, a synchronization subsequent the recovery begins at the anchor value 'n+i' in the device database 502.

Figure 6:
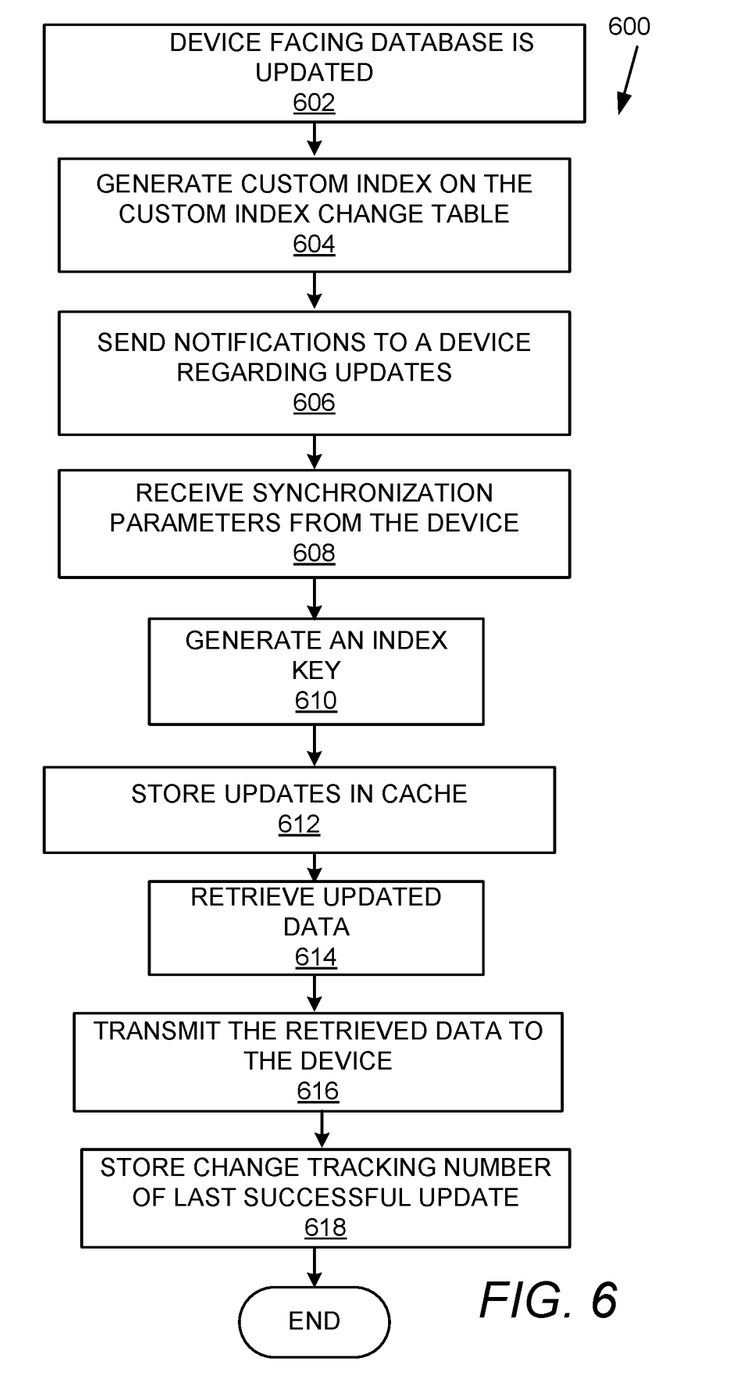
FIG. 6 is a flowchart that details a synchronization procedure executed by the synchronization system in accordance with examples disclosed herein.

FIG. 6 is a flowchart 600 that details a synchronization procedure executed by the synchronization system 150 in accordance with examples disclosed herein. The method begins at 602 with data being updated to the device facing database 120 from one or more of the databases $102_1$-$102_X$. The data updates may insert new rows or records in the device facing database 120, delete existing rows or records from the device facing database 120 or change particular column values in the device facing database 120. A respective unique identifier for each row of the updated data in the device facing database 120 is generated by the synchronization system 150. A custom index 124 including the unique identifiers for each new row of the updated data is generated at 604 in the custom indexed change table 122. One or more notifications are sent at 606 regarding the database updates. The notifications can be sent to those devices of the one or more devices $108_1$-$108_N$ which have the particular application(s) whose database(s) are updated installed thereon.

At 608, the synchronization parameters 162 are received from at least one of the one or more devices $108_1$-$108_N$ in response to the transmission of the notification. The synchronization parameters 162 are used to identify the data being requested, the device requesting the data, the anchor value at the device and the like. Based on the synchronization parameters 162 from the device, the synchronization system 150 generates the index key at 610. The updates to the device facing database 120 are also stored in the cache 112 at 612 and the updates to the corresponding change tables $104_1$-$104_X$ of the databases which were updated are also replicated at the custom indexed change table 122 at 612. The custom index 124 and the index key are used to retrieve the updated data at 614 from the cache 112. The data thus retrieved is transmitted to the device at 616. In an example, the device acknowledges receipt of an update and a record or row id associated with the last updated row may be stored at 618 as a change tracking number associated with the latest update.

Figure 7:
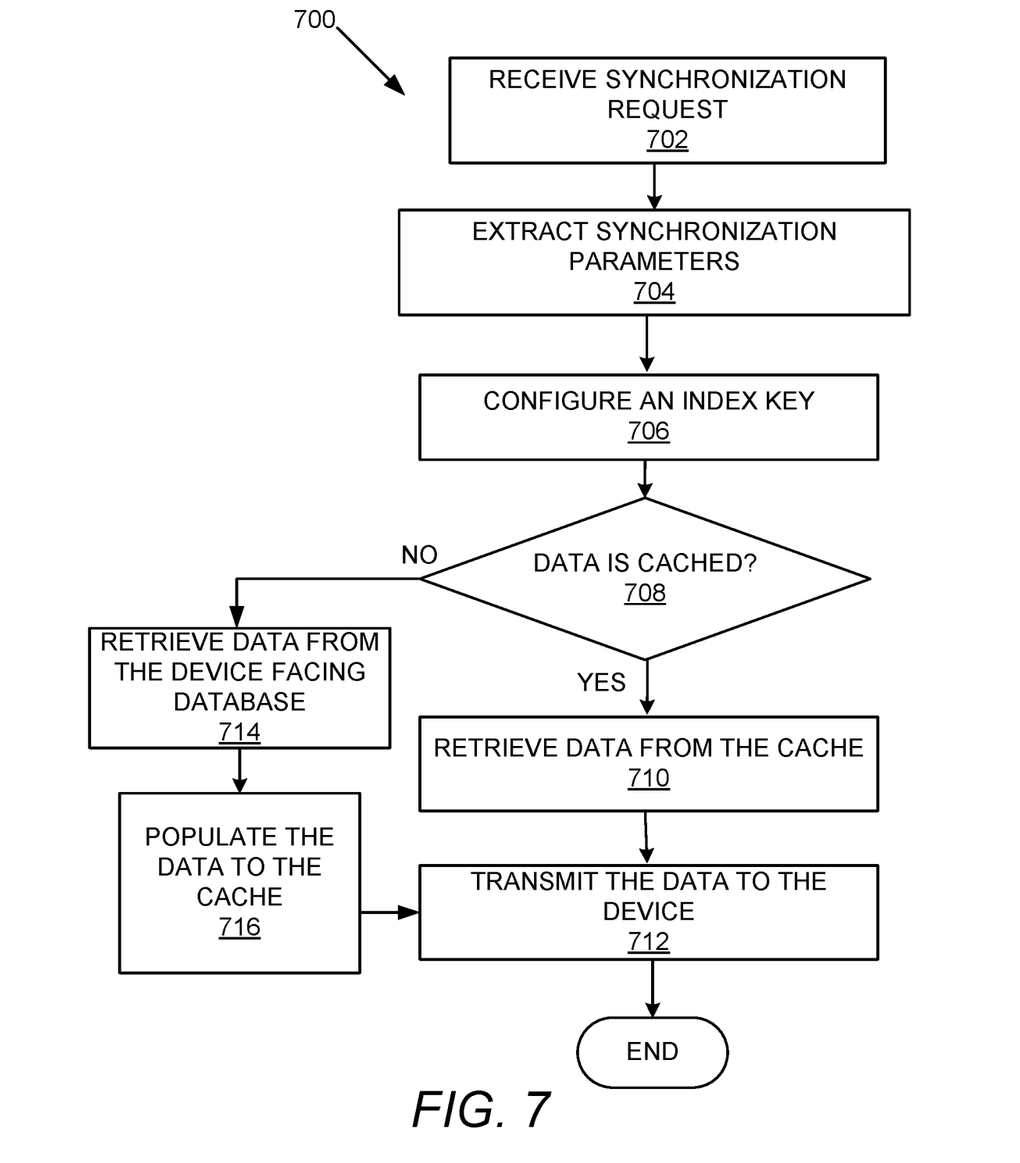
FIG. 7 shows a flowchart that details an example method of retrieving data using the index key for subsequent data requests from the devices.

FIG. 7 shows a flowchart 700 that details an example method of retrieving data using the configurable index key for subsequent data requests from the devices. When a synchronization request for data is received from one of the devices $108_N$ at 702, the synchronization parameters from the device $108_N$ are extracted from the synchronization request at 704, and the index key 310 corresponding to the synchronization parameters is configured at 706. The index key 310 is compared with the entries of the custom index 124 created on the custom indexed change table 122. At 708 it is determined if the data associated with the synchronization parameters is already stored in the cache 112. If yes, the data is retrieved from the cache 112 at 710 and transmitted to the device $108_N$ at 712. If at 708, it is determined that the data associated with the synchronization parameters is already not stored in the cache 112, the data requested by the device is retrieved from the device facing database 120 at 714, populated to the cache 112 at 716 and transmitted from the cache 112 to the requesting device $108_N$ at 712.

Below are discussed a few examples wherein multiple devices may provide the same synchronization parameters that result in the same index key being generated by the synchronization system 150. In an example, a subset of the devices $108_1$-$108_N$ may be located on a mass transit vehicle and may transmit the same synchronization parameters for location-based services that cause the synchronization system 150 to generate the same index key which allows the updates to be retrieved from the lower latency device facing database 120 as opposed to one or more databases $102_1$-$102_X$ from the backend. In another example, the application 260 may be an ecommerce website of a store which has one or more physical locations. A subset of the devices $108_1$-$108_N$ may be physically present in the one or more physical locations of the store. All the devices that are physically located in one of the stores may receive the same updates on sales, events and the like particular to that store. For example, a subset of the devices $108_1$-$108_N$ physically present in a particular aisle of one of the stores may receive the same updates for prices of the items in that aisle from the device facing database 120.

The examples discussed herein include the subset of the devices $108_1$-$108_N$ being within proximate locations wherein instances of the application 260 in each of the devices in the subset may receive the same updates from the application server 160. However, it can be appreciated that physical proximity is not necessary for the synchronization system 150 to generate the same index key in response to the devices transmitting the same synchronization parameters and that physically remote devices may also transmit the same synchronization parameters that cause the synchronization system to generate the same index key based on the situations.

Figure 8:
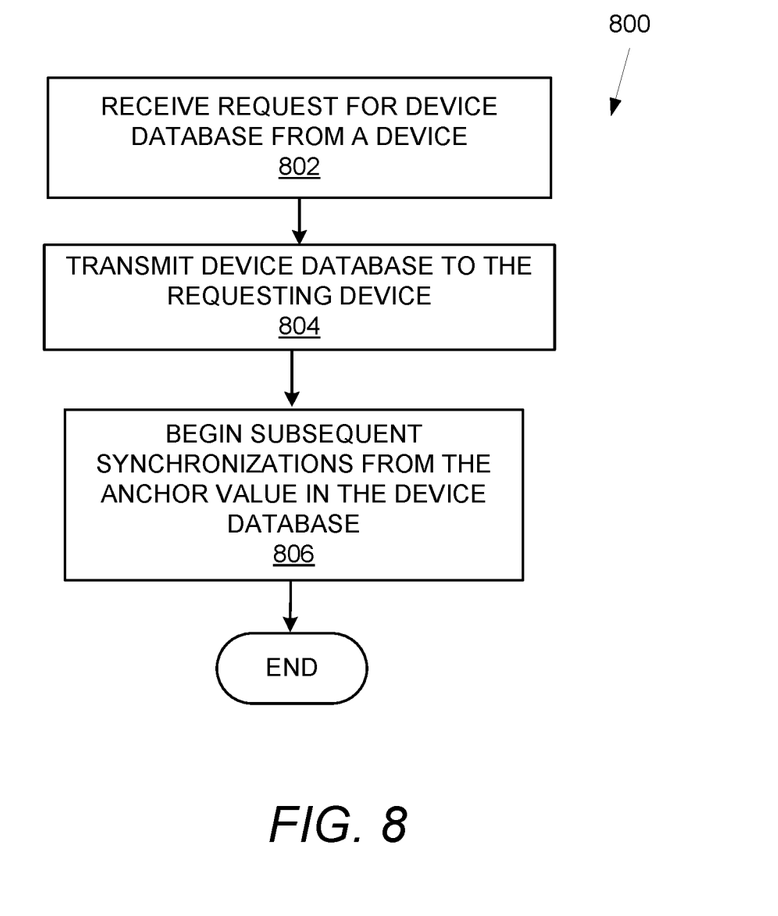
FIG. 8 is a flowchart that details an example recovery mechanism implemented by the synchronization system for a device database.

FIG. 8 is a flowchart 800 that details an example recovery mechanism implemented by the synchronization system 150 for a device database 280. The synchronization system 150 includes a device database generator tool 116 that runs periodically at configurable intervals of time to fetch the latest data associated with each of the devices $108_1$-$108_N$ from one or more of the databases $102_1$-$102_X$ and to generate a respective full device database on the device facing database 120 for each of the devices $108_1$-$108_N$. When the device database of a device such as, the device $108_N$ is corrupted and the anchor value stored therein is not accessible, the device database generated by the device database generator tool 116 provides for an effective recovery mechanism. Accordingly, a message to the synchronization system 150 transmitted by the device $108_N$ for obtaining a replica of the device database generated by the device database generator tool 116 is received at 802. The synchronization system 150 transmits the device database of the device $108_N$ that is generated by the device database generator tool 116 to the device $108_N$ at 804. A subsequent synchronization for the device $108_N$ at 806 begins at the anchor value in the device database provided the synchronization system 150. The recovery mechanism enables the device $108_N$ to begin subsequent synchronizations from the last value in the device database obtained from the device database generator tool 116 rather than the beginning from the application installation onwards as the case would be in the absence of the recovery mechanism afforded by the device database generator tool 116.

Figure 9:
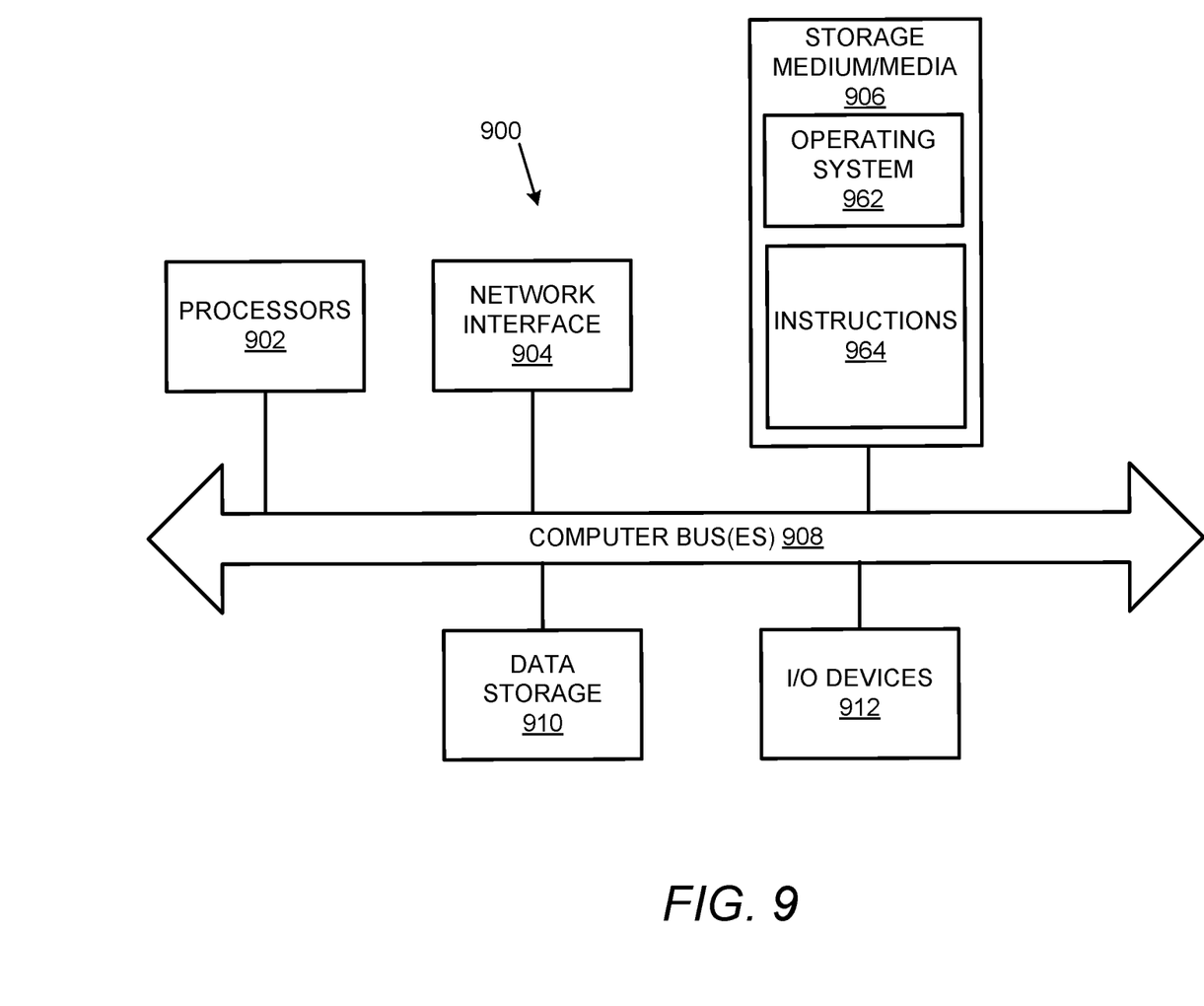
FIG. 9 is a block diagram that details an example of a computer system that may be used to implement the synchronization system.

FIG. 9 illustrates a computer system 900 that may be used to implement the synchronization system 150. More particularly, computing machines such as desktops, laptops, smartphones, tablets, wearables which may be used to generate or access the data from the synchronization system 150 may have the structure of the computer system 900. The computer system 900 may include additional components not shown and that some of the components described may be removed and/or modified. In another example, a computer system 900 can sit on external-cloud platforms such as, Amazon Web Services, or internal corporate cloud computing clusters, or organizational computing resources, etc.

The computer system 900 includes processor(s) 902, such as a central processing unit, ASIC or other type of processing circuit, input/output devices 912, such as a display, mouse keyboard, etc., a network interface 904, such as a Local Area Network (LAN), a wireless 802.11x LAN, a 3G or 4G mobile WAN or a WiMax WAN, and a computer-readable medium 906. Each of these components may be operatively coupled to a bus 908. The computer-readable medium 906 may be any suitable medium which participates in providing instructions to the processor(s) 902 for execution. For example, the computer-readable medium 906 may be non-transitory or non-volatile medium, such as a magnetic disk or solid-state non-volatile memory or volatile medium such as RAM. The instructions or modules stored on the computer-readable medium 906 may include machine-readable instructions 964 executed by the processor(s) 902 to perform the methods and functions of the synchronization system 150.

The synchronization system 150 may be implemented as software stored on a non-transitory computer-readable medium and executed by the one or more processors 902. For example, the computer-readable medium 906 may store an operating system 962, such as MAC OS, MS WINDOWS, UNIX, or LINUX, and code 964 for the synchronization system 150. The operating system 962 may be multi-user, multiprocessing, multitasking, multithreading, real-time and the like. For example, during runtime, the operating system 962 is running and the code for the synchronization system 150 is executed by the processor(s) 902.

The computer system 900 may include a data storage 910, which may include non-volatile data storage. The data storage 910 stores any data used by the synchronization system 150. The data storage 910 may be used to store the custom indexed change table 122, the cache 112, the indices generated on the custom indexed change table 122, the device databases generated by the device database generator tool 116 for the various devices and the like.

The network interface 904 connects the computer system 900 to internal systems for example, via a LAN. Also, the network interface 904 may connect the computer system 900 to the Internet. For example, the computer system 900 may connect to web browsers and other external applications and systems via the network interface 904.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A synchronization system for transmitting data to devices comprising:
  at least one processor;
  a non-transitory computer readable medium storing machine-readable instructions that cause the at least one processor to:
   update in a custom indexed change table, entries from a plurality of change tracking tables corresponding to individual databases of each of a plurality of applications;
   generate a custom index for the custom indexed change table from unique change tracking identifiers assigned to the entries from the plurality of change tracking tables updated to the custom indexed change table;
   receive from a device, a synchronization request for data associated with one of the plurality of applications, the synchronization request includes at least one synchronization parameter that is employed for retrieving the data requested by the device;
   configure an index key from the at least one synchronization parameter;
   access the custom index on a custom indexed change table for retrieving the data requested by the device;
   determine if the custom indexed change table includes change tracking data associated with the synchronization request by employing the index key on the custom index, wherein the index key forms an entry in the custom index if the change tracking data associated with the synchronization request is included in the custom indexed change table;
   if the change tracking data is included in the custom indexed change table,
    transmit the data from a cache associated with the custom indexed change table to the device;
   if the change tracking data requested by the device is not included in the custom indexed change table,
    identify one or more databases connected to the synchronization system that include the data requested by the device;
    retrieve the data requested by the device from the at least one database;
    store the data retrieved from the one or more databases in a device facing database;
    load the data retrieved from the device facing database into the cache associated the custom indexed change table; and
    transmit the data from the cache to the device in response to the synchronization request.

2. The synchronization system of claim 1, wherein the at least one synchronization parameter comprises a list of synchronization parameters that include at least a device type of the device and an anchor value that corresponds to a row id from a last data update received by the device.

3. The synchronization system of claim 1, wherein the non-transitory computer readable medium stores further machine-readable instructions that cause the at least one processor to:
  transmit a notification to one or more devices including the device regarding a data update available for synchronization.

4. The synchronization system of claim 3, wherein the non-transitory computer readable medium stores further machine-readable instructions that cause the at least one processor to:
  receive additional synchronization requests from at least a subset of the one or more devices, each additional synchronization request including a respective list of synchronization parameters.

5. The synchronization system of claim 4, wherein the non-transitory computer readable medium stores further machine-readable instructions that cause the at least one processor to:
  transmit, for a predetermined time period, the data from the cache to the subset of devices in response to the additional synchronization requests received from the subset of devices.

6. The synchronization system of claim 1, wherein the non-transitory computer readable medium stores further machine-readable instructions that cause the at least one processor to:
clear the cache upon expiry of a predetermined time period.

7. The synchronization system of claim 1, wherein the non-transitory computer readable medium stores further machine-readable instructions that cause the at least one processor to:
aggregate updated data from the one or more databases into the device facing database associated with the custom indexed change table.

8. The synchronization system of claim 1, wherein the machine-readable instructions for transmitting the data further comprise instructions that cause the at least one processor to:
transmit the data to the device in batches until the data requested by the device has been transmitted to the device.

9. The synchronization system of claim 1, wherein the non-transitory computer readable medium stores further machine-readable instructions that cause the at least one processor to:
replicate, by a device database generator tool, a device database of the device for storage at the synchronization system.

10. The synchronization system of claim 9, wherein the non-transitory computer readable medium stores further machine-readable instructions that cause the at least one processor to:
receive a message from the device regarding corruption of a device database on the device; and
transmit the device database to the device.

11. The synchronization system of claim 10, wherein the non-transitory computer readable medium stores further machine-readable instructions that cause the at least one processor to:
provide data in a subsequent synchronization from a change tracking number on the device database for the device.

12. A method of synchronizing data between a client device and a server comprising:
updating in a custom indexed change table, entries from a plurality of change tracking tables corresponding to individual databases of each of a plurality of applications;
generating a custom index for the custom indexed change table from unique change tracking identifiers assigned to the entries from the plurality of change tracking tables updated to the custom indexed change table;
collecting data associated with updates to one or more devices from one or more of the individual databases;
caching the data associated with the updates for the one or more devices;
periodically generating respective device databases based on the data associated with the updates of the one or more devices;
receiving from a device of the one or more devices, a message regarding a lost anchor value;
determining from the message, the device that lost the anchor value;
identifying a device database of the device from respective device databases of the one or more devices;
transmitting the identified device database to the device that sent the message regarding the lost anchor value, the identified device database including an anchor value pertaining to a last update obtained from at least one of the one or more individual databases;
receiving a synchronization request from the device for data associated with one of the plurality of applications, the synchronization request is received subsequent to the transmission of the identified device database and the synchronization request includes at least one synchronization parameter;
configuring an index key from the at least one synchronization parameter;
determining if the custom indexed change table includes a data update associated with the synchronization request by employing the index key on the custom index, wherein the index key forms an entry in the custom index if the change tracking data associated with the synchronization request is included in the custom indexed change table;
if the data update exists for the device from at least one of the one or more individual databases then,
transmitting the data update to the device, the data update updating the device database from the anchor value included in the identified device database; and
updating the anchor value to a last updated record id associated with the data update;
if no data update exists for the device from at least one of the one or more databases, then,
transmitting a message to the device that no data update exists for the device.

13. The method of claim 12, further comprising:
receiving from the device, an acknowledgement regarding successful synchronization of the device.

14. The method of claim 13, further comprising:
storing a change tracking number associated with the successful synchronization of the device.

15. The method of claim 12, wherein receiving the synchronization request including at last one synchronization parameter from the device further comprises:
receiving the synchronization request that comprises a list of synchronization parameters that include at least the anchor value pertaining to the last update and a device id.

16. The method of claim 15, further comprising:
parsing the synchronization request; and
obtaining the list of synchronization parameters.

17. The method of claim 12, further comprising:
providing information to a user regarding updates to at least one of the one or more devices from at least one of the one or more databases.

18. A non-transitory computer-readable storage medium comprising machine-readable instructions that cause a processor to:
store change tracking data from one or more databases in a custom indexed change table, wherein the one or more databases include a plurality of change tracking tables associated with a plurality of applications;
create a custom index on the custom indexed change table, the custom index including a unique identifier for each row of the change tracking data from the plurality of change tracking tables stored in the custom indexed change table;
receive from a device, a synchronization request for data, the synchronization request includes a list of synchronization parameters that are employed for retrieving the data requested by the device;
generate an index key from the list of synchronization parameters, the index key being customized to the device and the synchronization request;

determine if the custom indexed change table includes change tracking data associated with the data requested by the device by employing the index key on the custom index, wherein the index key forms an entry in the custom index if the change tracking data associated with the synchronization request is included in the custom indexed change table;

if the change tracking data is included in the custom indexed change table,
- transmit the data from a cache populated by a device facing database associated with the custom indexed change table to the device in response to the synchronization request;

if the change tracking data is not included in the custom indexed change table,
- identify at least one database of the one or more databases that include the data requested by the device;
- retrieve the data requested by the device from the at least one database;
- load the data retrieved from the at least one database into the cache via the device facing database associated with the custom indexed change table; and
- transmit the data from the cache to the device in response to the synchronization request.

19. The non-transitory computer-readable storage medium of claim 18, further comprising machine-readable instructions that cause the processor to:

periodically generate device databases for one or more devices including the device from data updates obtained from the one or more databases.

20. The non-transitory computer-readable storage medium of claim 18, wherein the machine-readable instructions to generate an index key from the list of synchronization parameters that cause the processor to:

parse the synchronization request; and obtain the list of synchronization parameters.

* * * * *